United States Patent
Pantages et al.

(10) Patent No.: US 6,631,406 B1
(45) Date of Patent: Oct. 7, 2003

(54) COMMON MANAGEMENT INFORMATION BASE (MIB)

(75) Inventors: Paul D. Pantages, McKinney, TX (US); Terry A. Clouthier, McKinney, TX (US); Ammar A. A. Taki, McKinney, TX (US); Nien-tai Kai Mao, Allen, TX (US)

(73) Assignee: Fujitsu Network Communications, Inc., Richardson, TX (US)

(*) Notice: Subject to any disclaimer, the term of this patent is extended or adjusted under 35 U.S.C. 154(b) by 0 days.

(21) Appl. No.: 09/325,690

(22) Filed: Jun. 3, 1999

(51) Int. Cl.[7] .......................... G06F 15/173; G06F 7/00; G06F 17/00
(52) U.S. Cl. ................. 709/223; 709/224; 707/100; 707/104.1; 707/200
(58) Field of Search ................. 709/200, 223, 709/216, 225, 229, 250, 224; 707/10, 3, 103, 100, 102, 104.1, 200

(56) References Cited

U.S. PATENT DOCUMENTS

| | | | |
|---|---|---|---|
| 4,339,633 A | | 7/1982 | Ahmed .................. 370/363 |
| 4,631,641 A | | 12/1986 | Brombal et al. ......... 361/818 |
| 5,317,742 A | * | 5/1994 | Bapat ...................... 707/3 |
| 5,412,652 A | | 5/1995 | Lu ....................... 370/223 |
| 5,467,348 A | | 11/1995 | Fujii et al. .............. 370/468 |
| 5,535,375 A | * | 7/1996 | Eshel et al. .............. 703/27 |
| 5,557,796 A | * | 9/1996 | Feshkens et al. ......... 712/220 |
| 5,764,955 A | * | 6/1998 | Doolan ................... 709/223 |
| 5,822,569 A | * | 10/1998 | McPartlan et al. ......... 703/21 |
| 5,832,498 A | * | 11/1998 | Exertier ................. 707/103 |
| 5,838,924 A | | 11/1998 | Anderson et al. ......... 704/239 |
| 5,968,138 A | * | 10/1999 | Clough ................... 710/8 |
| 6,009,431 A | * | 12/1999 | Anger et al. ............. 707/10 |
| 6,012,087 A | | 1/2000 | Freivald et al. .......... 709/218 |
| 6,016,495 A | * | 1/2000 | Mckeehan et al. ........ 707/103 |
| 6,083,353 A | | 7/2000 | Alexander, Jr. .......... 202/158 |
| 6,101,502 A | * | 8/2000 | Heubner et al. .......... 707/103 |
| 6,101,538 A | * | 8/2000 | Brown .................... 709/223 |
| 6,175,866 B1 | * | 1/2001 | Holloway et al. ........ 709/223 |
| 6,243,709 B1 | * | 6/2001 | Tung ..................... 707/103 |
| 6,260,062 B1 | * | 7/2001 | Davis et al. ............. 709/223 |

FOREIGN PATENT DOCUMENTS

WO  WO 94/23514  10/1994  ......... H04L/12/24

OTHER PUBLICATIONS

M. Trommer et al. in Multilayer–Architecture for SNMP–Based, Distributed and Hierachical Management of Local Area Networks Computer Communications and Networks, 1995. Proceedings; Fourth International Conference; IEEE Catalog No. : 95TB8110; pp. 272–279.*

M. Trommer et al. in Multilayer–Architecture for SNMP–Based, Distributed and Hierachical Management of Local Area Networks Computer Communications and Networks, 1995. Proceedings; Fourth International Conference; IEEE Catalog No. : 95TB8110; pp. 27.*

(List continued on next page.)

Primary Examiner—Frantz B. Jean
(74) Attorney, Agent, or Firm—Baker Botts L.L.P.

(57) ABSTRACT

In accordance with one embodiment of the present invention, a network element comprises a first subsystem operable to receive management transactions in a first management protocol and to map the transactions to a common management protocol. A second subsystem is operable to receive management transactions in a second management protocol and to map the transactions to the common management protocol. A common management information base (MIB) includes a dataset and a common interface to the dataset. The common interface is operable to access the dataset to process transactions received from the first and second subsystems in the common management protocol.

15 Claims, 3 Drawing Sheets

OTHER PUBLICATIONS

S. Mazumdar et al., "Design of Protocol Independent Management AGent to Support SNMP and CMIP Queries", Integrated Network Management, III Proceedings 3rd International Symposium, Apr. 18–23, 1993 (XP–000749257)

K. Iseda et al., "CORBA–Based Network Operation System ARchitecture" IEEE Network Operations and Management Symposium, US, New York, NY: IEEE: vol. 10, Feb. 15, 1998 pp. 639–648 (XP–000799535).

Alexander Keller, "Tool–based Implementation of a Q–Adapter Function for the seamless Integration of SNMP-managed Devices in TMN", IEEE Network Operations and Management Symposium, US, New York, NY: IEEE: vol. 10, Feb. 15, 1998 pp. 400–411 (XP–000799511).

Eckhart Koerner, "Design of a proxy for managing CMIP agents via SNMP", Computer Communications, NL Elsevier Science Publishers BV, Amsterdam, vol. 20, No. 5, Jul. 1, 1997, pp. 349–360 (XP–004126690).

International Search Report in International Application No. PCT/us 00/15553, dated Nov. 7, 2000, 7 pages.

International Preliminary Examination Report in International Application No. PCT/US00/15335, dated Apr. 20, 2001, 5 pages.

PCT International Search Report in International Application No. PCT/US00/15335, dated Oct. 24, 2000, 6 pages.

* cited by examiner

COMMON MANAGEMENT INFORMATION BASE (MIB)

RELATED APPLICATION

This application is related to copending U.S. application Ser. No. 09/325,683, entitled "METHOD AND SYSTEM FOR MANAGING MULTIPLE MANAGEMENT PROTOCOLS IN A NETWORK ELEMENT."

TECHNICAL FIELD OF THE INVENTION

This invention relates generally to telecommunications systems, and more particularly to a common management information base (MIB) for a network element in a telecommunications system.

BACKGROUND OF THE INVENTION

Telecommunications systems include customer premise equipment (CPE), local loops connecting each customer premise to a central office (CO) or other node, nodes providing switching and signaling for the system, and inter-node trunks connecting the various nodes. The customer premise equipment (CPE) includes telephones, modems for communicating data over phone lines, computer and other devices that can directly communicate video, audio, and other data over a datalink. The network nodes include tradition circuit-switch nodes, which have transmission pass dedicated to specific users for the duration of a call and employ continuous, fixed-bandwidth transmission as well as packet-switch nodes that allow dynamic bandwidth, dependent on the application. The transmission media between the nodes may be wireline, wireless, or a combination of these or other transmission medias.

In a telecommunication system, the nodes are managed by standardized management protocols such as Transaction Language One (TL-1), simple network management protocol (SNMP), Common Management Information Service Element (CMISE), and the like. Generally speaking, each of these management protocols includes a protocol agent and object model. The agent is responsible for parsing the external management commands and maintaining communication sessions with external management stations or users. The object model is a management information base (MIB). The MIB is a data structure built for a specific management protocol to exchange the management information between a node and external management stations.

Multiple protocol nodes that handle disparate types of traffic are typically required to support multiple management protocols such as TL-1, SNMP, and/or CMISE. Provision of multiple databases to support the different protocols requires large amounts of resources to implement the databases and maintain data integrity across the databases. One attempt to use a single database for multiple protocols configured the database in accordance with one protocol and used a protocol adapter for a second protocol. The protocol adapter translates protocol messages from the second protocol to the first protocol and responses back to the second protocol. Due to the incompatibility between management protocols, however, the adapter is a complex component that is expensive to implement. In addition, the adapter is inefficient due to the protocol translations, which slow down response time. Other attempts to support multiple management protocols with a single database provided only limited functionality for one of the protocols while creating special commands for the other. This solution is expensive to implement and provides only a partial solution.

SUMMARY OF THE INVENTION

The present invention provides a common management information base (MIB) that substantially eliminates or reduces problems associated with previous methods and systems. In particular, the common MIB provides a layer of abstraction to isolate internal data representations from data representations made externally to a network element. This allows a network element to have a single, consistent internal representation of data, and at the same time, support multiple different external interfaces for management.

In accordance with one embodiment of the present invention, the common MIB or other data store includes a set of data structures, a set of entity classes, and an interface object. The data structures each store data for an entity type. The entity classes each include specific functionality for an entity type. The interface object includes base functionality for the entity types. An interface is operable to generate an entity interface by loading the interface object with an entity class for an entity type and to access the data structure for the entity type using the entity interface.

More specifically, in accordance with a particular embodiment of the present invention, the data structures are stored in non-volatile memory, such as relational database tables. In this and other embodiments, the interface accesses the data structures by executing the entity interface. The entity interface is initially populated, executed, and responded to by executing function calls within the entity interface.

Technical advantages of the present invention include providing a protocol independent MIB for managing multi-protocol network elements within a telecommunications network. In particular, the common MIB provides a layer of abstraction to isolate data representations internal to the network element from data representations made externally to the network element. Moreover, the modular design of the common MIB allows for time and cost efficient testing, integration and packaging of the system.

Another technical advantage of the present invention includes providing an improved data store for storing data representations of a network element. In particular, the MIB includes a collection of managed entities (MEs) that includes a class definition and data attributes stored in non-volatile memory. The class definitions are instantiated to generate an interface for communicating with the data attributes in the non-volatile memory. In this way, a separate instance need not be continuously maintained for each ME. Therefore use of resources is optimized.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
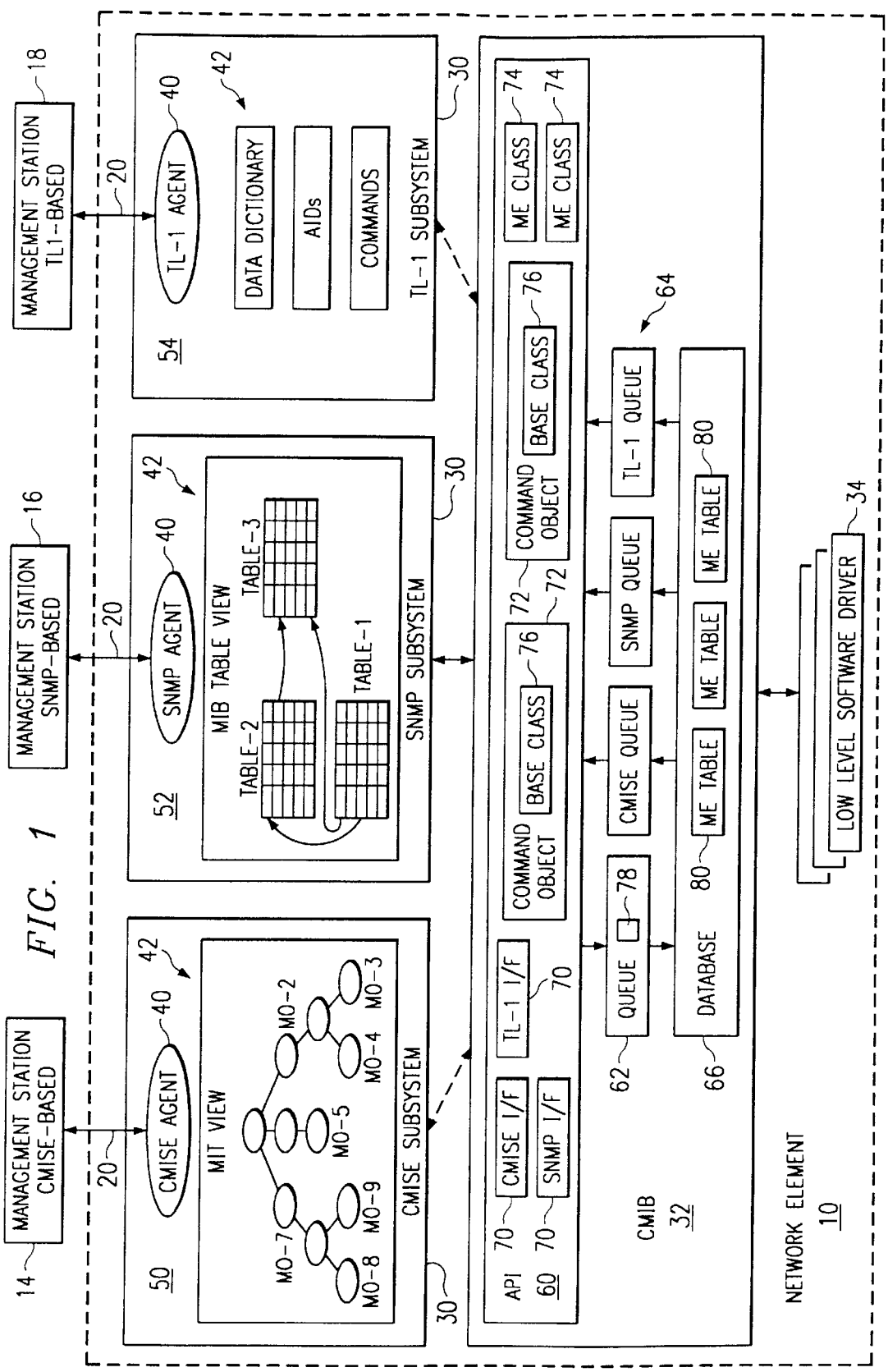
FIG. 1 is a block diagram illustrating a common management information base (MIB) in accordance with one embodiment of the present invention.

FIG. 1 illustrates management components of a multi-protocol network element (NE) 10 in accordance with one embodiment of the present invention. In this embodiment, the NE 10 includes Internet Protocol (IP), Asynchronous Transfer Mode (ATM), and Synchronous Optical Network (SONET) layers and functionality and can communicate over local area networks (LANs) as well as transmission line trunks. IP and other suitable traffic from the LAN is converted to ATM traffic for transmission by the SONET layer which forms the physical interface for the transmission line trunks.

The NE 10 supports Common Management Information Service Element (CMISE), simple network management protocol (SNMP), and Transaction Language One (TL-1) management protocols. A CMISE management station 14, SNMP management station 16, and TL-1 management station 18 are coupled to the NE 10 by a local area network (LAN), wide area network (WAN), or other communication link 20. Accordingly, the management stations 14, 16, and 18 may be local or remote from the NE 10.

Referring to FIG. 1, the NE 10 includes a plurality of protocol-specific subsystems 30, a common management information base (MIB) 32, and a set of low level software drivers 34. Each subsystem 30 includes a protocol-specific agent 40 and a data model 42. The protocol-specific agent 40 parses external management commands and maintains communication sessions with external management stations or users. The data model 42 maps protocol-specific management transactions received from a management station to a common management protocol for processing by the common MIB 32. Accordingly, all protocol-specific processing is local to the subsystems 30, allowing the common MIB 32 to be protocol independent.

For the embodiment of FIG. 1, the subsystems 30 include a CMISE subsystem 50 for supporting the CMISE management station 14, a SNMP subsystem 52 for supporting the SNMP subsystem 16, and a TL-1 subsystem 54 for supporting the TL-1 management station 18. The CMISE protocol is an OSI defined management service containing an interface with a user, specifying the service provided, and a protocol, specifying the protocol data unit format and the associated procedures. In the CMISE subsystem 50, the data model 42 is a Guideline for Definition of Managed Object (GDMO) which is an OSI specification for defining a management information structure used in the CMISE environment. SNMP is an IETF defined network management protocol including definitions of a database and associated concepts. In the SNMP subsystem 52, the data model 42 is an entity-relationship model in accordance with SNMP standards. TL-1 is an ASCII or man-machine management protocol defined by Bellcore and typically used to manage broadband and access equipment in North America. In the TL-1 subsystem 54, the data model 42 includes a data dictionary for access identifiers (AIDs) and commands in accordance with TL-1 standards. In this way, the data models 42 only occupy a small amount of memory resources in the network element 10 and keep protocol-specific processing local to each subsystem 50, 52, or 54.

The common MIB 32 includes an application interface (API) 60, a transaction queue 62, a set of response queues 64, and a database 66. The API 60 provides generic management functionality to the CMISE, SNMP, and TL-1 subsystems 50, 52, and 54. As described in more detail below, the common MIB 32 provides an efficient and flexible component to allow a telecommunications device to be controlled and monitored by external interfaces using specific management protocols.

The API 60 includes an interface object 70 for each subsystem 30 registered with the API 60, one or more command objects 72 for each registered subsystem 30, and a set of managed entity (ME) classes 74 to which protocol-specific transactions are mapped by the subsystems 30. As described in more detail below, by applying object-oriented modeling techniques, the information of the hardware and/or software resource is encapsulated into the class definition, which then provides service interfaces to other software components.

The interface objects 70 are each accessed by a corresponding subsystem 30 to communicate with the API 60. The interface object 70 for a subsystem 30 is created by the API 60 upon registration by the subsystem 30. At that time, the subsystem 30 requests a number of command objects 72 that can be simultaneously used by the subsystem 30, which are generated and allocated by the API 60.

The command objects 72 each encapsulate a base class 76 for the ME classes 74. The ME classes 74 each include specific functionality for an ME type. The base class 76 includes function calls, methods, parameters, behaviors, and other attributes shared by all or at least some of the ME classes 74. Accordingly, each command object 72 includes base functionality that is used by the ME classes 74 to access the database 66 or perform functions within the common MIB 32, such as communicating with the low level software driver 34 in order to determine or change the state of hardware in the NE 10. As described in more detail below, portions of the base class 76 may be overwritten by specific ME classes 74 when forming an ME command object 78. The ME command object 78 forms an interface for accessing ME attributes and functions in the database 66 and the low level software driver 34. In this way, each ME class 74 may select functionality from the base class 76 to be used in accessing the corresponding ME.

The transaction queue 62 stores ME command objects 78 generated by the API 60 in conjunction with the subsystems 30 for processing by the common MIB 32. In one embodiment, the transaction queue 32 is a first-in-first-out (FIFO) buffer that serializes processing in the common MIB 32 to prevent multiple operations from being performed at the same time, and thus prevent corruption of data, data contention, and race conditions within the common MIB 32.

In the database 66, attributes for each of the ME types are stored in ME data structures 80. Preferably, the data structures are non-volatile structures to ensure data integrity. In one embodiment, the database 66 is a relational database and the ME data structures 80 are relational database tables. It will be understood that the ME attributes may be otherwise suitably stored without departing from the scope of the present invention.

The response queues 64 store responses to transactions processed by the common MIB 32. In one embodiment, the response queues 64 include a discrete queue for each subsystem 30. In this embodiment, each subsystem 30 reads responses in its corresponding queue 64 and extracts data for generating a protocol-specific response for transmission to the management station originating the transaction. It will be understood that responses to transactions may be otherwise made available by the common MIB 32 to the subsystems 30.

Figure 2:
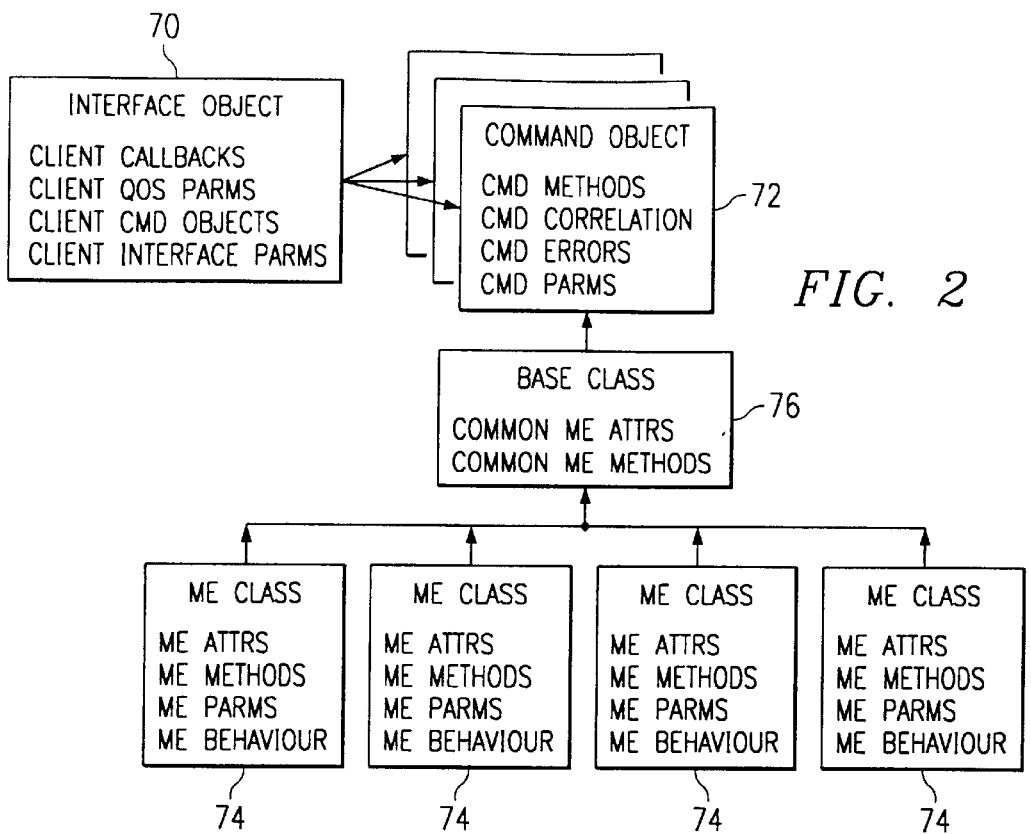
FIG. 2 is a block diagram illustrating relationships between interface, base and managed entities (ME) classes in the common MIB of FIG. 1 in accordance with one embodiment of the present invention.

FIG. 2 illustrates details of the object interfaces 70, command objects 72, and ME class objects 74 in accordance with one embodiment of the present invention. In this embodiment, the objects 70, 72, and 74 are each fully instantiated objects encapsulating both data and behavior and inheriting data and behavior from parent classes.

Referring to FIG. 2, the interface object 70 includes client callback, client quality of service (QoS), client command objects, and client interface parameters. The interface object 70 calls an associated command object 72 in the API 60.

The command objects 72 include command methods, command correlation, command errors, and command parameters. The command object 72 further inherits attributes of the base class 76. As previously described, the base class 76 includes common ME attributes and common ME methods.

The ME class objects 74 each include functionality associated with a particular ME type. Such functionality includes ME attributes, methods, parameters, and behavior for the ME type. Attributes of an ME class 74 are inherited by the command objects 72 through the base class 76 to generate the ME command object 78. As previously described, the ME command object 78 provides an interface for accessing data and functionality in the common MIB 32.

Figure 3:
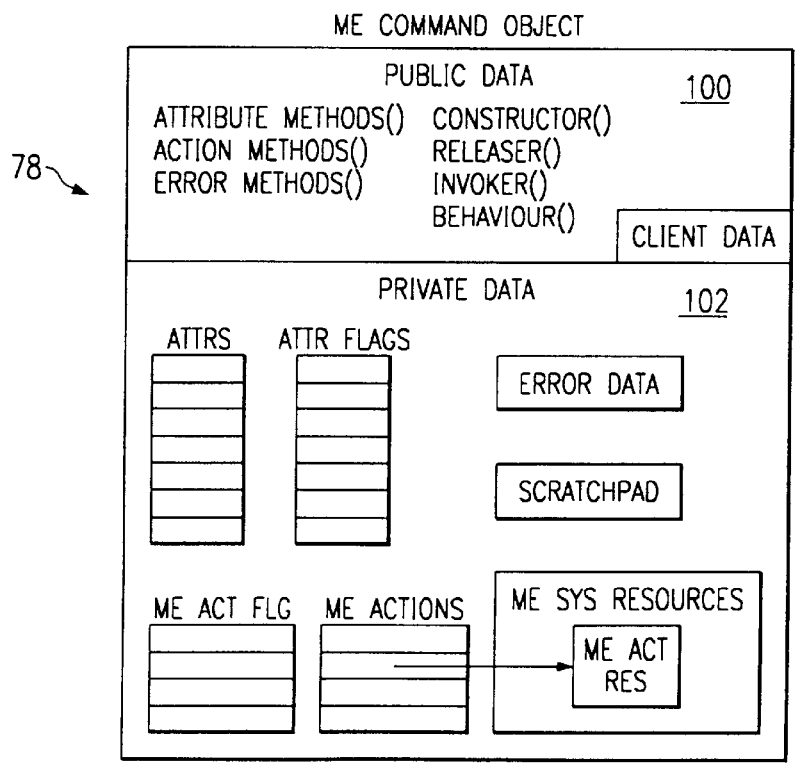
FIG. 3 is a block diagram illustrating the ME command object of FIG. 1 in accordance with one embodiment of the present invention.

FIG. 3 illustrates details of an ME command object 78 in accordance with one embodiment of the present invention. In this embodiment, the ME command object 78 is self contained. Any system resources obtained, such as memory or buffers are "owned" by the object 78 and released when the object 78 is destructed. It will be understood that the ME command object 78 may be otherwise suitably implemented for accessing data and attributes and common MIB 32.

Referring to FIG. 3, the ME command object 78 includes a public data section 100 and a private data section 102. The public data section 100 of the ME command object 78 is accessible by the client subsystem 30. The public data section 100 includes method functions that hide the structure, data manipulation, and allocation details from the client subsystem 30. In addition, the methods in the public data section 100 respond to affects of the methods chosen and perform any command integrity checks required.

In one embodiment, the methods may include inline functions, particularly those used for setting and retrieving small (typically integer) attribute values. Attribute methods, for example, will be available to populate get/set/create commands, and to retrieve values resulting from the same. Constructor, invoker, and releaser methods will be used to create, execute, and destroy ME command objects 78. Behavior methods are used by common MIB 32 to execute the commands.

The private data section 102 of the ME command object 78 includes data to complete the command. The response data for successful or error return will also be contained in the private data section 102. In one embodiment, any miscellaneous system resources dynamically allocated for the command are retained in the private data section 102. This type of allocation is preferably minimized.

Figure 4:
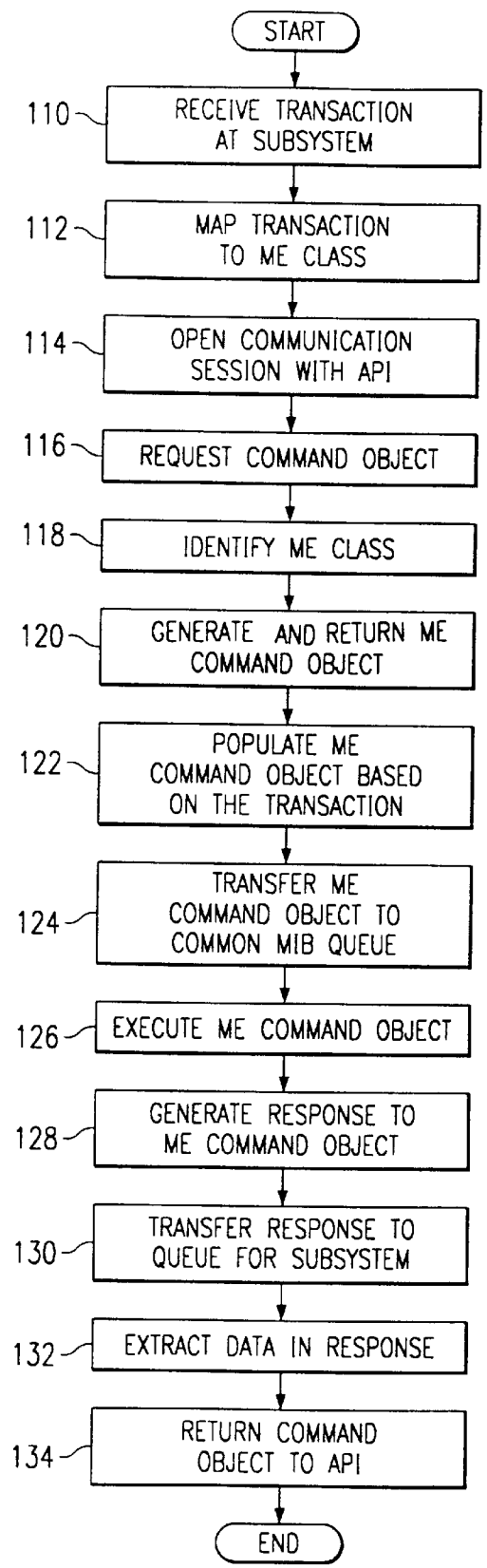
FIG. 4 is a flow diagram illustrating a method for performing a management transaction with the common MIB of FIG. 1 in accordance with one embodiment of the present invention.

FIG. 4 is a flow diagram illustrating a method for performing a management transaction in accordance with one embodiment of the present invention. In this embodiment, the transaction may be received from any one of the plurality of management stations in a management protocol supported by the NE 10.

Referring to FIG. 4, the method begins at step 110 in which subsystem 30 receives a transaction in a specific management protocol. Next, at step 112, the subsystem 30 maps the protocol specific transaction to a protocol independent ME class 74 which will be used by the common MIB 32 to perform the transaction. Mapping may include any suitable type of transaction, conversion, or associations. Accordingly, protocol specific processing is retained at the subsystem level.

At step 114, the subsystem 30 opens a communications session with the API 60. As previously described, the session may be opened by calling an interface object 70 in the API 60 corresponding to the subsystem 30. Proceeding to step 116, the subsystem 30 requests a command object 72 from the API 60. The subsystem 30 may use any number of command object 72 at a time up to the number allocated to the subsystem 30 in the API 60.

At step 118, the subsystem 30 identifies the protocol independent ME class 74 to which the protocol specific transaction was mapped. Next, at step 120, the API 60 generates and returns an ME command object 78 to the subsystem 30. As previously described, the ME command object 78 includes attributes of the base class 76 and the ME class 74. Portions of the ME class 74 may overload portions of the base class 76 to provide specific functionality in place of base functionality. At step 122, the subsystem 30 populates the ME command object 78 based on the transaction by calling command functions stored in the ME command object 78.

Proceeding to step 124, the populated ME command object 78 is transferred to the transaction queue 62 in common MIB 32 for processing. The transaction queue 32 serializes processing in common MIB 32 to prevent data contention between co-pending ME command objects 78. At step 126, the ME command object 78 is removed from the transaction queue 62 and executed by the common MIB 32. During execution, the ME command object 78 accesses the corresponding ME table 80 and/or performs functions in accordance with functions, behaviors, and parameters in the ME command object 78 which are based on the transaction.

Next, at step 128, the common MIB 32 generates a response in accordance with the function calls in the ME command object 78. At step 130, the response is transferred to the response queue 64 for the subsystem 30 that generated the ME command object 78. Next, at step 132, the subsystem 30 extracts data from the response and generates a protocol specific response for transfer back to the requesting management station. At step 134, the subsystem 30 releases the command object 72 back to the API 60. In this way, the common MIB 32 provides a layer of abstraction to isolate data representations internal to the. network element 10 from data representations made externally to the network element 10. Data integrity and consistency is guaranteed as only a single database is maintained.

Although the present invention has been described with several embodiments, various changes and modifications may be suggested to one skilled in the art. It is intended that the present invention encompass such changes and modifications as fall within the scope of the appended claims.

What is claimed is:

1. A network element, comprising:
   a first subsystem operable to receive first management transactions in a first management protocol and to map the first management transactions to a common management protocol;
   a second subsystem operable to receive second management transactions in a second management protocol and to map the second management transactions to the common management protocol;

a common management information base (MIB) comprising a dataset and a common interface to the dataset, the common interface comprising software stored in a computer-readable medium and operable to access the dataset to process the first and second management transactions from the first and second subsystems in the common management protocol;

the dataset comprising data structures, each data structure storing data for a managed entity type;

the common management information base (MIB) further comprising a set of managed entity classes, each managed entity class comprising specific functionality for a managed entity type;

the common management information base (MIB) further comprising an interface object comprising base functionality for the managed entity types; and the common interface operable to generate a managed entity interface by loading the interface object with a managed entity class for a managed entity type and to access the data structure for the managed entity type using the managed entity interface.

2. The network element of claim 1, wherein the data structures are table structures.

3. The network element of claim 1, further comprising the common interface operable to access the data structure for the managed entity type by executing the managed entity interface.

4. A data store, comprising:

a set of data structures, each data structure storing data for an entity type of a plurality of entity types;

a set of entity classes, each entity class comprising specific functionality for an entity type;

an interface object comprising base functionality for the entity types; and an interface comprising software stored on a computer-readable medium, the interface operable to generate an entity interface by loading the interface object with an entity class for an entity type and to access the data structure for the entity type using the entity interface.

5. The data storage of claim 4, further comprising the interface operable to access the data structure for the entity type by executing the entity interface.

6. The data store of claim 4, wherein the set of data structures comprise table structures.

7. The data store of claim 4, wherein the data structures comprise tables in a relational database.

8. The data store of claim 4, further comprising the common interface operable to populate the entity interface by executing function calls within the entity interface.

9. The data storage of claim 4, further comprising the common interface operable to generate a response to a transaction initiating generation of the entity interface by executing function calls within the entity interface.

10. A method for storing data, comprising:

storing data for each of a plurality of entity types in a data structure;

encapsulating specific functionality for each of the entity types in an entity class;

encapsulating base functionality for the entity types in an interface object;

in response to a request to access data for an entity type, generating an entity interface by loading the interface object with the entity class for the entity type; and accessing the data structure for the entity type using the entity interface.

11. The method of claim 10, further comprising accessing the data structure for the entity type by executing the entity interface.

12. The method of claim 10, further comprising storing data for the entity types in table structures.

13. The method of claim 10, further comprising storing data for the entity types in relational database tables.

14. The method of claim 10, further comprising populating the entity interface by executing function calls stored in the entity interface.

15. The method of claim 10, further comprising generating a response to a transaction initiating generation of the entity interface by executing function calls stored in the entity interface.

* * * * *